United States Patent [19]

Stencel

[11] 4,007,659
[45] Feb. 15, 1977

[54] FASTENER INSERT WITH IMPROVED ANTI-ROTATION AND PULL-OUT CHARACTERISTICS

[75] Inventor: Edgar L. Stencel, Huntington Beach, Calif.

[73] Assignee: VSI Corporation, Pasadena, Calif.

[22] Filed: Feb. 13, 1975

[21] Appl. No.: 549,562

Related U.S. Application Data

[63] Continuation-in-part of Ser. No. 396,263, Sept. 11, 1973, which is a continuation of Ser. No. 238,420, March 27, 1972, abandoned, and a continuation-in-part of Ser. No. 448,009, March 4, 1974, abandoned, which is a continuation-in-part of Ser. Nos. 342,875, March 19, 1973, abandoned, and Ser. No. 238,420, March 27, 1972, abandoned.

[52] U.S. Cl. .................................. 85/70; 85/75
[51] Int. Cl.² .................................... F16B 13/10
[58] Field of Search ............. 85/70, 71, 72, 73, 74, 85/75, 77, 78; 151/41.74

[56] References Cited

UNITED STATES PATENTS

| | | | |
|---|---|---|---|
| 2,409,352 | 10/1946 | Gill | 85/70 |
| 2,803,984 | 8/1957 | Swenson | 85/70 |
| 3,007,364 | 11/1961 | Dickie | 85/70 |
| 3,110,212 | 11/1963 | Wing et al. | 85/74 |
| 3,271,058 | 9/1966 | Anderson | 151/41.74 |
| 3,292,482 | 12/1966 | Fry et al. | 85/78 |
| 3,412,639 | 11/1968 | Sauter | 85/72 |
| 3,477,335 | 11/1969 | Gold et al. | 85/72 |
| 3,515,419 | 6/1970 | Baugh | 85/70 |
| 3,683,740 | 8/1972 | Martin | 85/72 |

FOREIGN PATENTS OR APPLICATIONS

| | | | |
|---|---|---|---|
| 1,241,123 | 8/1960 | France | 85/70 |
| 1,010,802 | 11/1965 | United Kingdom | 85/78 |
| 1,158,907 | 7/1969 | United Kingdom | 85/73 |

*Primary Examiner*—Roy D. Frazier
*Attorney, Agent, or Firm*—Irvin A. Lavine

[57] ABSTRACT

A blind fastener system comprising a ductile sleeve having an expansion portion of small inner diameter in a thin workpiece and having a bulbing portion of larger inner diameter extending on the blind side of the workpiece, and a threaded expander member having an expander portion for expanding the sleeve expansion portion and a head portion for bulbously deforming the sleeve bulbing portion, both actions occurring on axially pulling the expander member. The expander portion has a tapered, radiused leading end followed by a configured (splined, knurled, etc.) portion for the remainder of the active length. The protrusions of the configured portion leave a void volume between them and between the minor and major diameters of the protrusions, and the volume of the sleeve expansion portion between the small inner diameter and the projection of the large inner diameter is approximately 0.5 to 0.8 of the void volume of the configured portion. The protrusions have blunt outer surfaces. The expander member may be a nut, in which case the minor diameter of the protrusion is at least 1.23 times the major diameter of the internal threads of the expander member, which threads are inwardly of at least a portion of said protrusions. The length of the bulbing portion is approximately one-half the outer diameter thereof, while the large inner diameter is approximately nine-tenths of the outer diameter of the sleeve bulbing portion. The axial length of the sleeve expansion portion is at least equal to the thickness of the workpiece, and the expansion section of the expander member is at least equal to the axial length of the expansion portion of the sleeve.

The expander member may have internal threads, to serve as a nut, or may have a stem with external threads, to serve as a bolt or stud. The stud may receive an electrical connector, the fastener system being of suitable electrically conductive materials.

17 Claims, 13 Drawing Figures

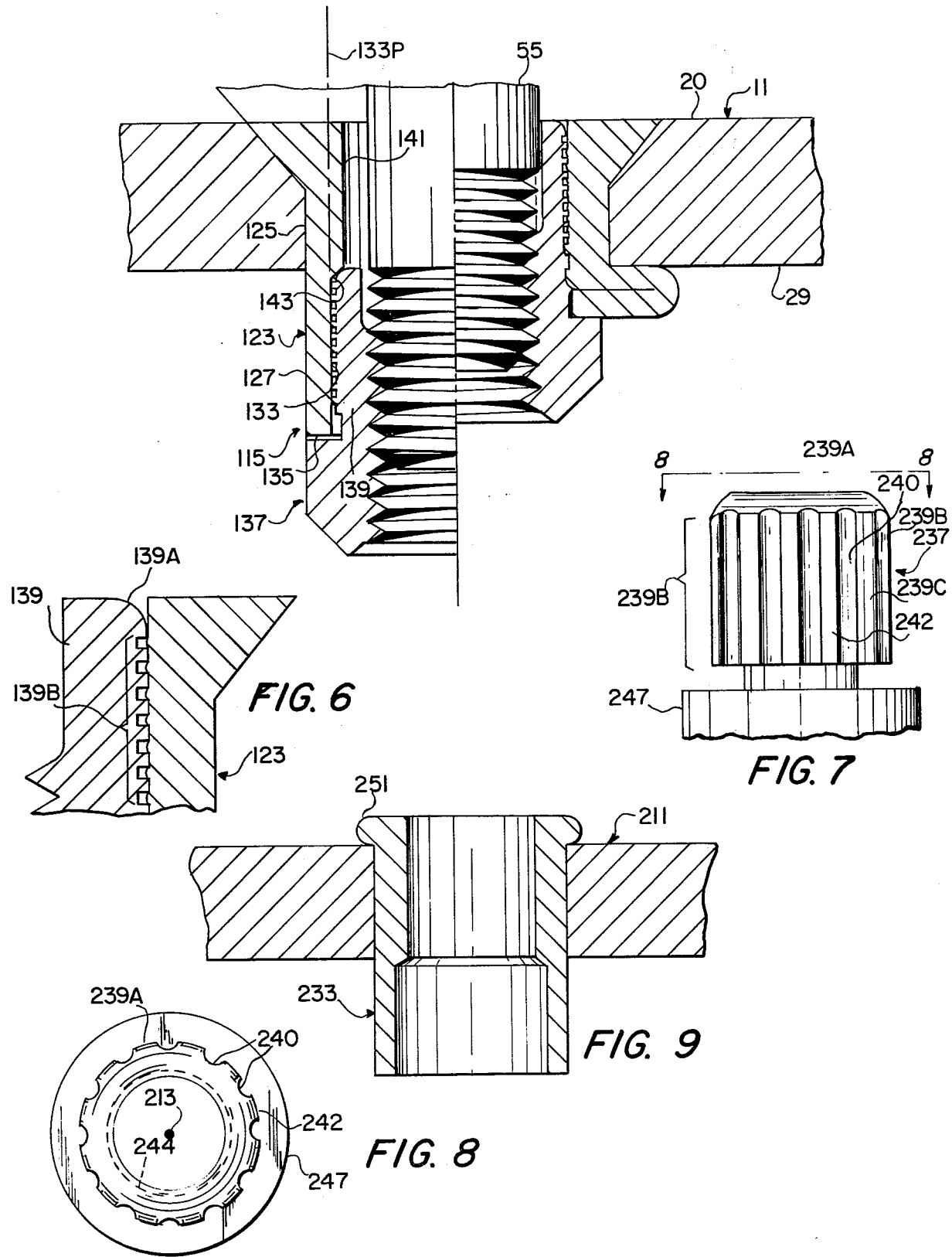

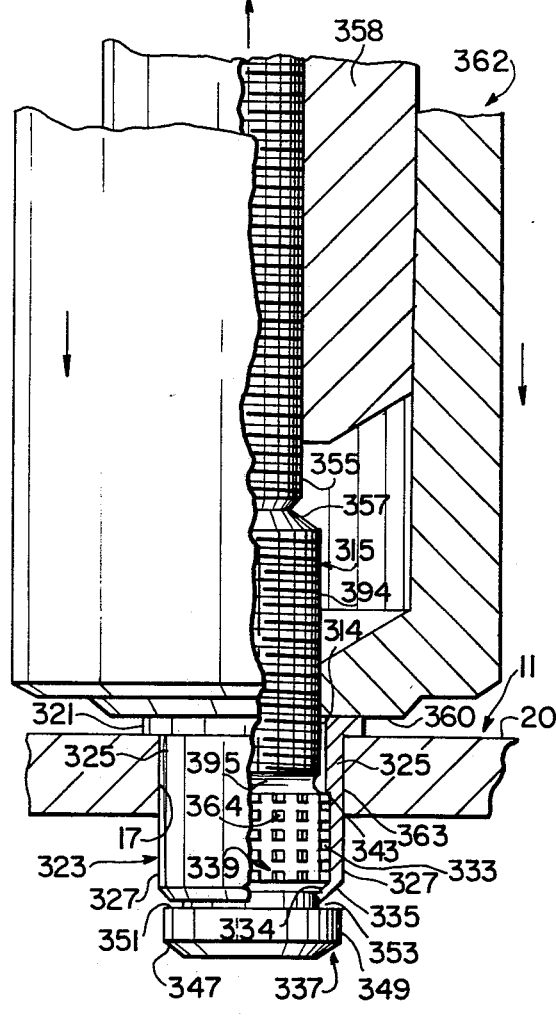
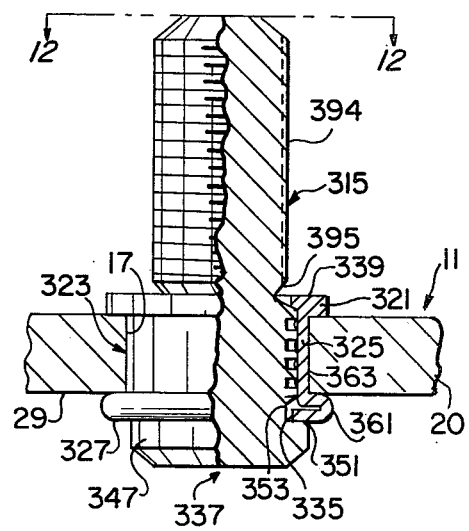
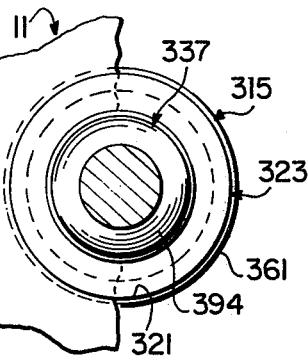
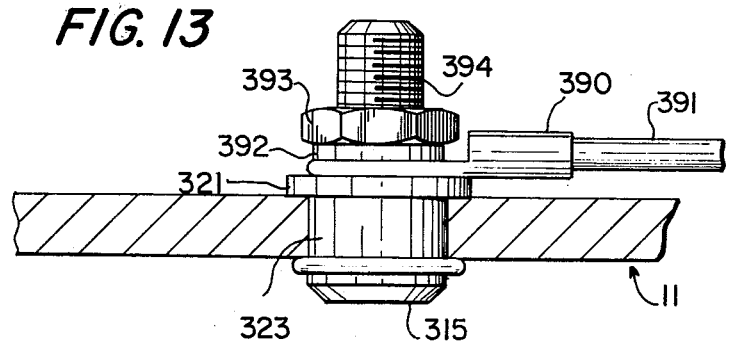

FASTENER INSERT WITH IMPROVED ANTI-ROTATION AND PULL-OUT CHARACTERISTICS

CROSS REFERENCE TO RELATED APPLICATIONS

This is a Continuation-In-Part of application Ser. No. 396,263 filed Sept. 11, 1973, which is a Continuation of application Ser. No. 238,420 filed Mar. 27, 1972, now abandoned, and is a Continuation-In-Part of Ser. No. 448,009, now abandoned, filed Mar. 4, 1974, which is a Continuation-In-Part of Ser. No. 342,875, now abandoned, filed Mar. 19, 1973, and of Ser. No. 238,420, filed Mar. 27, 1972, now abandoned.

BACKGROUND OF THE INVENTION

The present invention relates to fastener systems of the blind or one side access type, for use in mechanically connecting a threaded member to a sheet of material, and for an electrical connection.

Fastener systems are used to enable various screw threaded members, either male or female, to be secured to workpieces, which workpieces are in the form of flat sheets or the like. Typically, a fastener system is disposed in a hole or aperture provided in a sheet of metal or the like, to which a threaded member is to be attached. Thus, the fastener system has internal threading where a bolt is to be received, or may be in the form of an externally threaded member, where a nut is to be received. Whether the system has male or female threads, an important requirement is that it not torque loose upon being subjected to a twisting applied load, as in tightening a bolt or a nut. The system should be able to sustain a relatively high twisting or torquing load, imposed by a mating bolt or an associated nut, without rotating relative to the workpiece. At that load at which rotation occurs, the system is said to torque out. It is desirable, therefore, that a fastener system have a high torque-out value, which desideratum has not been previously obtained where a satisfactorily light-weight fastener system has been used in connection, particularly, with very thin sheets or workpieces, which are in some instances of relatively soft material. The problem is greatest in connection with the attachment of members through the use of fastener systems to thin aluminum sheets of relatively low hardness value, such as are used in many aircraft and aerospace applications.

Another requirement for such fastener systems is that it be held securely to the workpiece against axial movement, so that it will not come out of the hole in the workpiece upon application of an axial load.

As above mentioned, such fastener systems are particularly useful in blind hole applications, which frequently occur in the aircraft and aerospace field, and it is in this field, in particular, where weight considerations are of such great importance. Hence, it is another desideratum that such fasteners be applicable from one side of the workpiece only, and also that they not extend for a very great distance beyond the back surface of the workpiece, as in many situations, the space available for a fastener to be inserted, on the blind side of the workpiece, is very limited.

There have been provided in the prior art a number of suggestions for blind fastener inserts. These have included inserts which provided a sleeve member having a first portion of its axial length which was adapted to be expanded radially outwardly into engagement with the material in a workpiece defining a hole into which the sleeve member had been inserted, the sleeve member also having a bulbing portion which extended on the blind side of the workpiece. An expander member, having internal threads, was provided, shaped and dimensioned relative to the sleeve member so that upon axial movement thereof relative to the sleeve member, it caused the sleeve member to expand radially outwardly, the expander member also including a head which served to bulbously deform a bulbing portion of the sleeve member when the expander member was moved axially relative thereto. The provision of such blind fastener inserts has found acceptability by the purchasers thereof, such as aircraft and aerospace manufacturers, but their performance has not been as great as is desired, in connection with the above mentioned factors of torque-out of the insert relative to the workpiece, axial pull out of the insert from the workpiece, and in addition, there is the problem that the threaded member could rotate relative to the sleeve, after the fastener insert is in place, and a torque is applied to the threaded member.

Accordingly, it is the general object of the present invention to provide a blind fastener system of the above discussed type, having improved performance characteristics, as above discussed, while also being of relatively light weight, and not requiring a large space on the blind side of the workpiece.

SUMMARY OF THE INVENTION

The present invention provides a blind fastener system which comprises a sleeve which has an expansion portion having a relatively small inner diameter and a bulbing portion having a relatively larger inner diameter, the bulbing portion extending, during installation, on the blind side of a workpiece. In particular, the workpiece may be of very thin aluminum sheet, and a relatively soft characteristic. An expander member is provided having an expander portion which serves to expand the expansion portion of the sleeve, and also having a head portion for bulbously deforming the sleeve bulbing portion, the expansion and bulbous deforming occurring upon an axial pulling of the expander member. The expander member is internally threaded, or, alternatively, the expander member may include a bolt-like extension having external threads.

The expander portion is characterized by a radiused leading end, the word "leading" indicating the front part of the expander member considering the direction of motion of the expander member when axially slid or pulled. The radiused leading end is followed by a configured portion. This configured portion is provided with such configurations as splines, knurling or the like. Splines extend longitudinally of the expander member, while knurls provide individual isolated elements, in the form of "islands." The configured portion is characterized by having an inner diameter, with the configurations protruding or extending outwardly of this inner diameter, to an outer diameter. The protrusions consequently leave a void volume between them and between the minor and major diameters of the configured portion. The protrusions have radiused outer surfaces, rather than sharp ridges, peaks or points. Certain dimensional relationships obtain in connection with the present invention, and include the relationship of the volume of the sleeve expansion portion between the small inner diameter thereof and the projection of the larger inner diameter thereof being approximately 0.5 to 0.8 of the void volume of the configured portion. Also, the minor diameter of the configured portion is at least 1.23 times the major diameter of nut threads of the expander member.

Important dimensional relationships exist in connection with the bulbing portion of the sleeve: thus, the length of the bulbing portion, which is that portion extending beyond the rear surface of the workpiece, is approximately one-half of the outer diameter of the sleeve, while the large inner diameter of the sleeve, which extends the length of the bulbing portion, is approximately 0.90 to 0.92 of the outer diameter of the sleeve bulbing portion.

The axial length of the sleeve expansion portion is at least equal to the thickness of the workpiece, and the expansion section of the expander member is at least equal to the axial length of the expansion portion of the sleeve, in a flush head embodiment of the sleeve. Where the sleeve has a protruding or extending head, the expander portion of the expander member is at least equal to the thickness of the workpiece, which is also the minimum length of the sleeve expansion portion.

The sleeve is at least as ductile as the expander member, and may be, preferably, more ductile than the expander member.

BRIEF DESCRIPTION OF THE DRAWING

FIG. 5 is a cross sectional view, similar to FIG. 1, showing an improved fastener insert in accordance with the present invention.

FIG. 6 is an enlarged detail view of parts shown in FIG. 5, after insertion and setting.

FIG. 7 is an elevational view of an improved expander nut member in accordance with the present invention.

FIG. 8 is a view taken on the line 8—8 of FIG. 7.

FIG. 9 is a cross sectional view, showing an embodiment of a sleeve member with a protruding head.

FIG. 10 is a partially sectioned view of a further embodiment of a fastener system of the invention, incorporating a threaded stud fastener member, shown in a preinstalled condition.

FIG. 11 is a partially sectioned view of the fastener system of FIG. 10, shown in the installed condition.

FIG. 12 is a view taken generally along the lines 12—12 of FIG. 8.

FIG. 13 shows a stud fastener member like that of FIGS. 10 to 12, in the form of a blind electrical attachment device.

DESCRIPTION OF THE PREFERRED EMBODIMENTS

Figure 1:
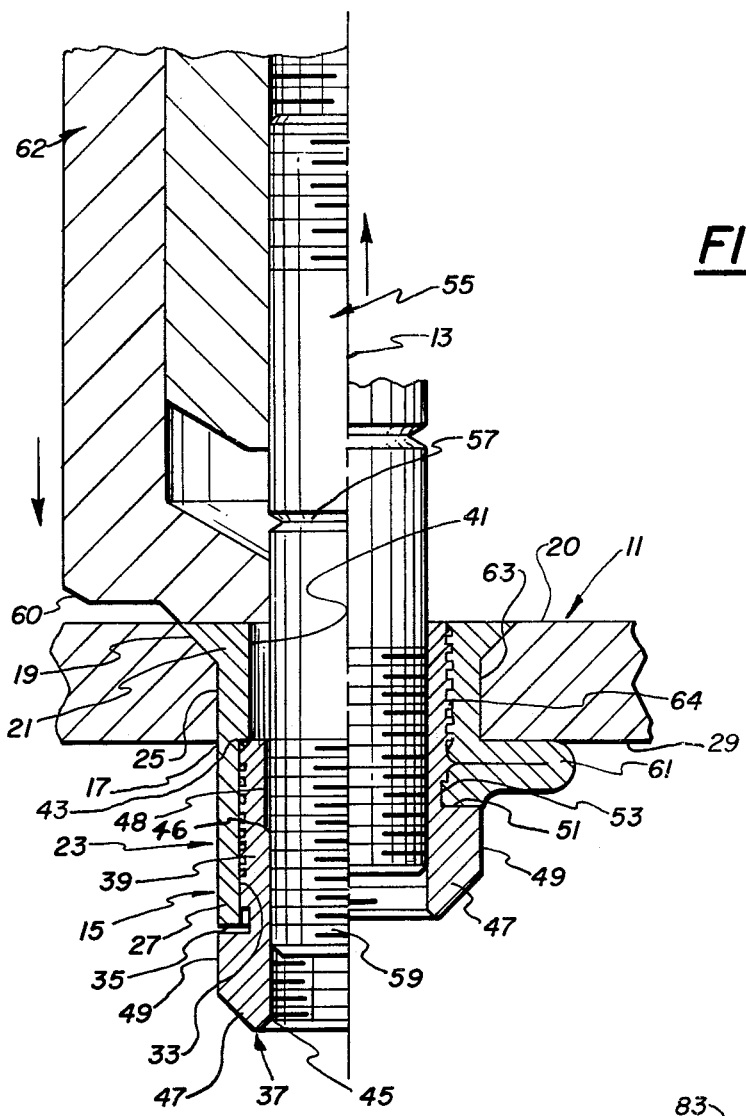
FIG. 1 is a cross sectional view of a fastener insert and workpiece, and associated pulling tool, in the installed and set positions.

Turning now to FIG. 1 there is seen a workpiece 11 which normally will be of a metal sheet or the like. The left side of a center line 13 shows a fastener insert 15 in the position before it is affixed to the sheet 11, while the right side of the center line shows the insert after it has been seated and locked into the sheet of the workpiece. A hole or aperture 17 is provided in the workpiece in which the insert 15 can be seated. In the embodiment shown, in insert is of a flush installation. Thus, the workpiece has a countersunk portion 19 in the top side 20 in which a radial head portion 21 of a constant outer diameter sleeve 23 of the insert can be seated in a flush manner. The sleeve 23 has a first portion 25 which extends from the head 21 thereof through the aperture 17 in the workpiece. A second portion 27 of the sleeve 23 integrally formed with portion 23 extends beyond a blind side surface 29 of the workpiece opposite the top surface 20 in which the head portion 21 of this sleeve is seated.

The sleeve 23 has an enlarged inner diameter 33 which extends along the sleeve from an end 35 of the sleeve opposite the head end, terminating in the example shown adjacent the surface 29. In other words, the enlarged inner diameter 33 is generally axially coextensive with the second portion 27 of the sleeve and extends outwardly from the blind side 29 of the workpiece. Second portion 27 of the sleeve is of lesser thickness than first portion 25. The sleeve is preferably formed of highly ductile type material such as 300 series stainless steel.

Shown partially seated within the enlarged inner diameter 33 of the sleeve 23 is a slidable nut member 37. The nut member 37 has a shank portion 39 having an outer diameter about equivalent to the enlarged inner diameter 33 of the portion 27 of the deformable sleeve. The outer diameter of the shank 39 of the nut is larger than the reduced diameter 41 of the first portion 25 of the sleeve member and thus will abut against a circumferential ledge 43 formed at the junction of the reduced inner diameter 41 and the enlarged inner diameter 33 of the deformable sleeve.

The nut member 37 is internally threaded extending from a trailing end 45 along its inner diameter to a point 46 intermediate of its length. The remainder 48 of the nut is counterbored to assure a constant thread engagement with a mating bolt. The trailing end 45 of the nut member is provided with an enlarged head portion 47 which has an effective outer diameter 49 that is larger than the inner diameter 33 of the sleeve portion 27. The diameter 49 of the head portion 47 should not exceed the diameter of the hole in the workpiece in order for the nut to be used in blind hole applications. In other words, the effective outer diameter 49 of the head will not exceed the outer diameter of the sleeve. Where the enlarged head portion 47 adjoins the shank portion 39 of the nut 37, a bearing surface 51 is formed which is disposed adjacent the end 35 of the sleeve. Further, there is provided a peripheral recess 53 adjacent the bearing surface 51. The recess 53 extends inwardly so as to have an effective inner diameter less than the inner diameter 33 of the sleeve 23. This will assist in preventing further movement of the nut element under axial loading.

A pull stem 55 can be utilized together with a suitable engaging tool to seat the fastener insert of this invention. As shown, the pulling stem 55 has a break off notch 57 and a threaded end 59 which engages the threads of the nut member. When the stem is pulled in an upward direction away from the top surface 20 of the workpiece 11 it can be seen that the bearing surface 51 of the nut member engages the end 35 of the sleeve, the head end of which reacts against an anvil 60 of a pulling tool 62, causing the sleeve to buckle and form a bulb 61. At a predetermined level, the pulling stem will break at the notch 57 thus preventing over-stressing of the threads of the nut. The end of the nut member 37 opposite the head portion 47 is flush with the plane of the top side 20, as shown in FIG. 1, right side. The end 35 of the sleeve becomes seated in recess portion 53 adjacent the bearing surface 51 and serves to further lock the sleeve relative to the nut member.

The bulbed area 61, together with the radial head portion 21 serves to axially lock the sleeve member relative to the workpiece 11. Thus, axial locking is achieved, yet without any further working of the sleeve member there would be no means for preventing rotation of the nut and the sleeve within the hole 17. Thus, an important part of the herein invention involves the effect of the shank portion 39 acting upon the reduced diameter portion 41 of the deformable sleeve. As the nut is moved axially in driving toward surface 20 it can be seen that the harder nut material will force the softer deformable sleeve material to deform and flow radially outwardly against the workpiece until movement of the nut is prevented due to the formed bulb 61 of the sleeve. For example, the nut can be made of 400 series stainless steel or materials of similar modulus. The cold working of the deformable sleeve material in the portion 25 within the workpiece by the the stem 39 causes the stem and sleeve portion 25 to interlock with each other and causes the outer diameter 63 of the shank portion of the sleeve 23 to lock or wedge against the hole or aperture 17 provided in the workpiece. This effectively prevents the possibility of rotation of either the sleeve or the nut member. The aforegoing is achieved because the stem 39 has a cylindrical outer diameter about its periphery and along its length that is greater than the inner diameter 41 of the portion 25 of the sleeve that is within the workpiece. The outer surface of the shank portion of the nut may be provided with serrations 64 which serve to interlock the nut to the sleeve upon expansion of the sleeve so as to prevent rotation of the two members relative to each other.

When the pulling stem 55 has been removed, the fastener insert 15 will receive a mating bolt threaded into the nut member 37. The mating bolt has a constant engagement with the counterbored remainder 48 of the nut member 47, and since nut member 47 ends substantially flush with the top side 20, which is in the shear plane of an assembled fastener and bolt, it is firmly supported in the fastener insert 15 against wobble and shear.

Figure 3:
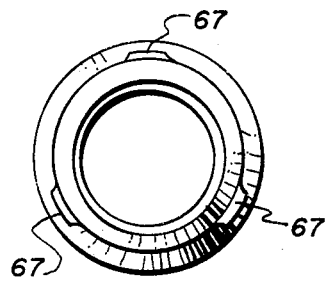
FIG. 3 is a top view taken along the line 3—3 of FIG. 2.
Figure 2:
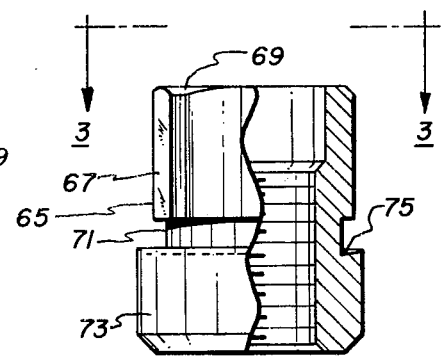
FIG. 2 is a partially sectioned view of a nut-expander member, showing a different embodiment.

Turning to FIGS. 2 and 3 there is seen a nut 65 of a second embodiment. The nut 65 rather than having a constant outer diameter in a shank portion thereof is provided with a plurality of radially extending lobes 67 which extend axially from one end 69 to adjacent a peripheral groove 71 provided adjacent an enlarged head portion 73 of the nut. The effective outer diameter achieved by the lobes 67 may be slightly larger than the outer diameter of the shank portion 39 in FIG. 1. The advantage of the three or more lobes in FIG. 2 compared with a constant outer diameter as in the FIG. 1 embodiment also illustrates an aspect of the invention which aids in interlocking the deformable sleeve in the recess 71. It can be seen that a surface 75 formed where the enlarged head portion 73 joins the recess 71 is sloped downwardly away from end 69 and inwardly. This aids in directing the end of the deformable sleeve to more readily flow into the recess as it moves along the slightly inclined surface 75.

Figure 4:
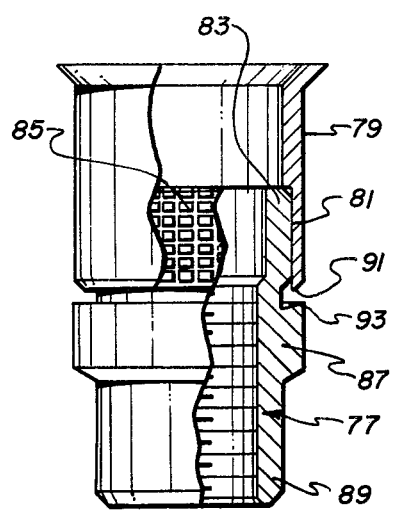
FIG. 4 is a partially sectioned view of another embodiment of a fastener insert.

Turning now to FIG. 4 there is seen a further embodiment. A nut member 77 is seen partially inserted within a deformable sleeve 79. In this embodiment, an outer periphery 81 of a nut member portion 83 is seated within a portion of the sleeve 79 and has a plurality of serrations 85 thereabout which serve to further aid in engagement of the nut with the deformable member after the nut is fully seated therein and to prevent rotation. The nut member 77 is provided with an enlarged portion 87 which serves to cause and effect the bulbing of the deformable sleeve. The nut 77 is extended beyond the enlarged portion 87 at portion 89 to provide an elongated interior threaded portion which serves to fully engage mating bolt threads. The nut end 91 of the sleeve 79 is chamfered to further ease the movement of the sleeve into the recess in cooperation with a slanted surface 93 adjacent the recess.

Through the fastener insert of the invention is shown in FIG. 1 with the utilization of a pulling stem 55 which will break at 57, at a determined stress value, it should be understood that other types of tools can be utilized in place of a pull stem which will effectuate the desired locking of the nut to the deformable sleeve within a workpiece.

Referring now to FIG. 5, there is shown a preferred embodiment of a fastener insert 115, which is generally similar to the fastener insert 15 shown in FIG. 1, but having certain significant modifications thereof, set forth as follows. Thus, the sleeve 123 has a first expansion portion 125 with a reduced or relatively small inner diameter 141 and an enlarged inner diameter 133 which is generally axially coextensive with the second bulbing portion 127 thereof. A chamfer or tapered shoulder 143 connects the smaller inner diameter 141 and the larger inner diameter 133.

The nut expander member 137 has a shank-like expander portion 139 which may be seen in FIG. 6 to include an entry portion having a leading end 139A which is tapered: it may be chamfered, i.e., a conic section, but is preferably radiused, i.e., convex as shown. The leading end 139A is followed by a configured portion 139B. The configured portion 139B is here shown in the form of isolated protrusions, similar to FIGS. 1 and 4 hereof, but may also take other shapes, including splines which extend parallel or even inclined to the axis of nut expander member 137. Whatever particular shape is used to provide the configured portion, the protrusions, splines, knurls, etc., which form an integral part of the configured portion 139B are provided with outer surfaces which are convex or radiused, and establish the outer diameter of the configured portion 139B of the nut member 137.

The configured portion 139 has a minor diameter, at the base of the voids between the protrusions, and has a major diameter, which is the diameter of the outer surface of the protrusions, splines, etc. The configured portion minor diameter is at least 1.23 times the major diameter of the internal threads of the expander member 137. Referring again to the sleeve 123, it will be observed that there is a specific volume of material of sleeve 123 which exists, referring to the left side of FIG. 5, between the sleeve smaller inner diameter 141 of the expander portion 125 and the projection 133P of the sleeve enlarged inner diameter 133, located in the bulbing portion 127, this volume being also defined by the length of the expansion portion 125. Thus, this volume of the expansion portion 125 is that volume which is displaced when the pull stem 55 is pulled, to set the fastener as shown at the right hand side of FIG. 5. That annular volume has a relationship to the void volume of the configured portion 139B of expander member 137, being specifically approximately 0.5 to 0.8 of the void volume of configured portion 139B.

In connection with the above relationships, it is noted that the relationship of configured portion minor diameter to major thread diameter is such as to give minimum weight, with adequate strength, a relationship not heretofore known. In connection with the outward expansion of the expansion portion 125 of sleeve 123 upon axial sliding movement of the expander member 137 by the expander portion 139 thereof, the chamfered leading end 139A coacts with the chamfer 143 of sleeve 123 to initiate the outward plastic flow of the material of the sleeve expansion portion 125, this being followed by the further outward expansion of the sleeve expansion portion 125 as the expander member 137 advances, and more particularly, as the configured portion 139B thereof advances through the expansion portion 125. Because of the properties of the material of the sleeve 123, the sleeve will tend to plastically flow inwardly into the space provided by the voids of the configured section 139B of the expander member 137, as shown more particularly in FIG. 6. This provides superior torque-out characteristics in relation to torque-out of the fastener insert 115 relative to the workpiece 11, and of the expander member 137 relative to the sleeve 123.

As will be recognized, manufactured parts have tolerances, and in general, the closer the tolerances required, the more expensive the part is to produce. In fastening inserts into workpieces as herein disclosed, the diameter of the hole of a workpiece, in a particular example, may vary between 0.3125 inches to 0.3165 inches, while the outer diameter of the expander portion 125 may be 0.3120 inches. When the expander member 137 advances, the above noted volume of the sleeve 123 expansion portion 125 must be displaced, and so for a hole of the largest tolerance limit, there must be an expansion of 0.0045, while for the smallest size hole the expansion is only 0.0005. For the largest size tolerance, with the present construction, the expansion portion 125 is expanded outwardly sufficiently so as to engage and provide a stress in the portion of the workpiece 11 immediately surrounding the aperture therein, while with the minimum tolerance hole size, the void volume of the configured portion 139B is such as to permit material of substantial amount from the expansion section 125 to flow or move into the void volume. Hence, with the present construction, high torque-out characteristics are provided, even where there is an acceptable tolerance range of the size of the hole or aperture in workpiece 11. This is enhanced by the construction of the configured portions, wherein the outer surfaces of the protrusions, knurls, splines thereof are blunt, or more appropriately, convex, rather than sharp and cutting as in the prior art. This enables material of the sleeve to be displaced or moved aside, rather than being cut, scored, or the like, thereby contributing to the high torque-out characteristics. This is particularly significant where the workpiece 11 is thin and of relatively soft material, such as 5052-H34 aluminum, having a thickness of 0.030 –0.032 inches. Fasteners in accordance with the present invention achieve a 100 inch-pound torque-out characteristic when tested in accordance with Government Specification MIL-N-25027, which requires only a 60 inch-pound torque resistance.

In such noted soft material, a large expansion of the sleeve 123 is accommodated by plastic flow of the material of the workpiece 11 immediately surrounding the hole, thereby producing a denser grain in the workpiece near the hole or aperture. The residual radial preload of the workpiece resists rotation of the fastener and improves the fatigue life of the workpiece. In contrast, in a relatively harder sheet material, the same fastener insert 115 is entirely satisfactory, because although there is less plastic flow or deformation of the workpiece material surrounding the hole, the void volume permits the acceptance by the expander member 137 of any excess material of the sleeve expansion portion 125.

Another significant relationship of the fastener insert 115 shown in FIG. 5 is in connection with the relative dimensions of the bulbing portion 127. The length of bulbing portion 127, taken from the blind side or surface 29 or workpiece 11 to the end 135 of sleeve 123 is approximately one-half (0.50) of the outer diameter of the sleeve 123, in conjunction with the larger or enlarged inner diameter 133 being approximately 0.90 to 0.92 of the outer diameter of sleeve 123. This provides a construction and interrelationship, which may be employed and useful independently of the sleeve expansion function, so as to provide light weight, minimum blind side extension, with security against axial pull out, after the bulbing portion 127 has been deformed to provide the return fold configuration with an enlarged pad engaging the blind side surface 29, as shown at the right side of FIG. 5.

A further and significant relationship is of the axial length involved, it being important that the length of the expansion portion 125 be at least equal to the thickness of workpiece 11, and that the length of the expander portion 139 also be at least equal to the length of the expansion portion 125 of sleeve 123.

Referring to FIGS. 7 and 8, there is shown a preferred form of the expander member, designated 237, and including an expander section 239 provided with a chamber or tapered shoulder leading end 239A, followed by the configured portion 239B in the form of splines which extend axially, having voids 240 between the individual splines 242. As will be observed from FIG. 8, the outer surfaces of the spline 242 are convex, specifically being parts of a cylinder having its center located on the center line 213. There is also shown the head 247 of the expander member 237.

Referring particularly to FIG. 8, the major thread diameter is indicated by the dashed line 244, while it will be seen that a circle could be drawn defining the minor diameter of the voids 240, and therefore the minor diameter of the configured portion 239B. As previously noted, the configured portion minor diameter is 1.23 times the thread major diameter 244, at least.

It is believed that the configuration on the exterior of an expander member such as member 237 results in a tendency for the sleeve to expand in a manner which is circumferentially non-uniform. That is, those portions of the sleeve radially outwardly of the splines expand more, with a lesser or attenuated expansion or no expansion of the portions which are outwardly of the spaces between the splines. It is further believed that this results in a circumferentially non-uniform hoop stress in the material of the workpiece surrounding the hole, thereby contributing to the resistance to rotation of the fastener in the workpiece, and particularly of the sleeve to rotate in the workpiece. That is an attenuated or modulated non-uniformity and is distinguished from and superior to the stresses resulting from fasteners in which the outer surface of the sleeve is initially configured, splined, knurled, serrated, etc. Where such latter construction has been used, when the thus configured sleeve is expanded there results not only a non-uniform stressing of the material of the workpiece surrounding the hole but the generation of high stress concentrations or so-called "stress-risers," resulting in a deleterious effect on the fatigue strength of the workpiece. Since such stress risers are avoided or at least diminished by the present construction, the improved fatigue strength of the workpiece is believed to be a result thereof.

In FIG. 9 there is shown a sleeve 223, differing from the sleeve 123 by the provision of a protruding head 251, instead of the flush head configuration shown in FIGS. 5 and 6. Where an insert fastener is provided with such a sleeve 223, the expansion portion thereof includes the length within workpiece 211, plus the extent of protrusion of the head 251. Assuming that an expander member 237 is associated with the sleeve 223, the length of the expander portion 239 would be at least equal to the length of the expansion section of sleeve 223, including the length of the protruding head 251. This provides for the satisfactory setting of the fastener insert as thus formed, with suitable torque-out and pull out characteristics.

FIGS. 10 to 12 show a fastener system 315 which is another embodiment of the fastener system of the present invention. Fastener system 315 comprises generally a sleeve 323 and an expander member in the form of a stud expander member 337.

The sleeve 323 has a head portion 321, a deformable first expansion portion 325, and an end portion 327, all generally similar to the portions of sleeve 123. The head portion 321 is a protruding rather than a countersunk head. The sleeve 323 is shown with its outer diameter 363 received in a hole 17 in a workpiece 11 which has an accessible surface 20 and a lower surface 29. The inner diameter 341 of portion 325 is smaller than the inner diameter 333 of portion 327. There is a shoulder or lip 343 between these two inner diameters 341 and 333.

The stud expander member 337 has an enlarged head portion 347 and an expander portion 338, generally like portions of nut expander member 137, FIG. 5, configured as at 364, or could be like the nut expander member 237, FIG. 7. The head portion 347 has an outer diameter 349 which is about the same as the sleeve outer diameter 363. The head portion 347 has an upward facing peripheral lip or shoulder 351 and an annular groove or recess 353 above the shoulder and between the head portion and the expander portion 339. The lower end 334 of the expander portion is tapered radially inwardly and the lower end 335 of the sleeve portion 327 is bent or formed inwardly about that lower end 334. This maintains the sleeve and the stud expander member together prior to installation of the workpiece, helps ensure proper bulbing of the sleeve portion 327, and helps prevent push-out of the stud expander member 337 after installation.

The stud expander member 337 further comprises a threaded fastening portion 394 integrally formed at the upper end of the expander portion 339. An annular undercut of recess 395 is provided between the threaded portion 394 and the expander portion 339 to facilitate threading of the portion 394. The threaded portion 394 extends upwardly beyond the sleeve head 321, for subsequent threaded attachment to a mating bolt (not shown).

Integrally formed at the upper end of threaded fastening portion 394 is a pulling stem section 355. An annular breakoff groove 357 is provided between the fastening portion 394 and the pulling section 355. The pulling section 355 may have gripping means such as threads or grooves which are releasably engaged by holding means 358 of an installation tool 352. An anvil 360 of the tool abuts the head portion 321 of the sleeve while the pulling stem 355 is pulled by the holding means 359 to set the fastener 315. At a predetermined axial load, the stud member 337 will break at groove 357, having the installed fastener 315 as shown in FIGS. 11 and 12. It will be noted that the expander portion 339 has sufficient length to extend, when the fastener is installed, at least to the workpiece upper surface 20 in the preferred embodiment. Thus, as the surface 20 the installed fastener presents, by virtue of expander portion 339 and sleeve portion 325, an essentially continuous structure that acts against wobble and shear of the stud expander member.

The stud-type fastener 315 of FIGS. 10 and 12 has similar features, relationships and beneficial results as the insert or nut-type fasteners of FIGS. 5 and 9.

Instead of having a pull-stem section, the threaded fastening portion of the stud-type fastener member may be gripped by the tool for pulling the stud member into place. Since the break-off groove would be eliminated in such an arrangement, the tool would desirably be provided with means that would limit the amount of pull that would be applied to the stud member, to avoid damaging the threads.

FIG. 13 shows a terminal lug 390 of an electrical member or element such as a grounding strap 391 disposed on the threaded portion 394 of the stud member 337, immediately above and in contact with the head portion 321 of the sleeve 323. The terminal 390 is shown held in place by a washer 392 and nut 393, the latter threaded onto stud portion 394.

Alternatively, a lug 390 of an electrical conductor may be attached to the insert or nut-type fastener of FIGS. 1–8 by means of a headed bolt or screw (not shown) which threads into the nut member 37, 137 or 237 to hold the lug in contact with accessible end of a sleeve.

For this electrical application with a workpiece of metal the sleeve is made of a material which has suitable mechanical properties to deform as described above, and also has high electrical conductivity. To prevent electrolytic corrosion between the sleeve and workpieces of certain metals, where needed, the sleeve may be tin plated or similarly plated or coated.

There has been provided an improved fastener system having superior torque-out and pull out characteristics, usable in both relatively hard and relatively soft materials, preferably metal, and which do not require exceedingly fine tolerances for the holes or apertures to be provided in the workpiece. Further, the blind fastener systems herein provided require very little space on the blind side of the workpiece, and are of suitably light weight, as required for aircraft and aerospace applications in particular.

It will be obvious to those skilled in the art that various changes may be made without departing from the spirit of the invention and therefore the invention is not limited to what is shown in the drawings and described in the specification but only as indicated in the appended claims.

I claim:
1. A blind fastener system for connecting a threaded member to a relatively thin, plate-like workpiece having a hole and an accessible surface comprising:
   a. an outer relatively ductile deformable cylindrical sleeve having;
      i. an expansion portion of small inner diameter in the workpiece, and
      ii. a bulbing portion of a larger inner diameter on the blind side of the workpiece, and
   b. a slidable relatively non-deformable threaded expander member comprising:
      i. an expander portion for expanding the expansion portion of the sleeve on axial movement of the expander member, said expander portion being of a larger diameter than the inner diameter of the sleeve expansion portion, and having an exterior configured portion at least part of which is movable into said sleeve expansion portion,
      ii. an enlarged head portion for engaging the blind side end of the sleeve for bulbously deforming said sleeve bulbing portion on axial movement of the expander member,
      iii. an axial bore extending into said expander member from the end opposite said enlarged head portion, said bore being internally threaded over at least an axial portion thereof lying inwardly of said configured portion,
      iv. the minor diameter of the configured portion in at least about 1.23 times the major thread diameter.
   c. said system being characterized by the expander member expander portion having:
      i. an entry portion having a tapered loading end, and
      ii. a configured portion rearwardly thereof and having a substantial portion thereof within the workpiece after axial movement,
   d. said sleeve having a tapered shoulder between said inner diameters.

2. The blind fastener system of claim 1, wherein said configured portion of said expander comprises protrusions extending outwardly from a minor diameter thereof, said protrusions being radiused at their outer extremities.

3. The blind fastener system of claim 2, said protrusions being axially extending splines.

4. The blind fastener system of claim 2, said protrusions comprising a plurality of protrusions located axially and circumferentially on said configured portion.

5. The blind fastener system of claim 2, wherein said configured portion has a void volume between the minor and major diameters thereof left unoccupied between outwardly extending protrusions, and wherein the volume of the sleeve expansion portion between the inner diameter thereof and the projection of the inner diameter of the bulbing portion is approximately 0.5 to 0.8 of the void volume of the configured portion.

6. The blind fastener system of claim 1, wherein said configured portion has a void volume between the minor and major diameters thereof left unoccupied between outwardly extending protrusions, and wherein the volume of the sleeve expansion portion between the inner diameter thereof and the projection of the inner diameter of the bulbing portion is approximately 0.5 to 0.8 of the void volume of the configured portion.

7. The blind fastener system of claim 1, wherein the internal diameter of the sleeve bulbing portion is approximately 0.90 to 0.92 of the outer diameter thereof.

8. The blind fastener system of claim 1, wherein the axial length of the bulbing portion of the sleeve is approximately one-half the outer diameter of the said bulbing portion.

9. The blind fastener system of claim 1, wherein the length of the expansion portion is at least substantially equal to the thickness of the workpiece.

10. The blind fastener system of claim 9, wherein the sleeve has a recessed head.

11. The blind fastener systems of claim 9, wherein the sleeve has a protruding head, and the length of the expansion portion is at least substantially equal to the workpiece thickness plus the axial height of the head.

12. The blind fastener system of claim 1, said entry portion leading end being radiused.

13. The blind fastener system of claim 1, wherein said expander member has a threaded stud extending therefrom.

14. A blind fastener system for placement of a threaded member in a hole in a relatively thin, plate-like workpiece having an accessible surface comprising:
   a. an outer relatively ductile deformable cylindrical sleeve having;
      i. an expansion portion of small inner diameter in a workpiece, and
      ii. a bulbing portion of a large inner diameter of the blind side of the workpiece,
   b. a slidable relatively non-deformable expander member comprising:
      i. an expander portion for expanding the expansion portion of the sleeve on axial movement of the expander member, said expander portion being of larger diameter than the inner diameter of the sleeve expansion portion, and
      ii. an enlarged head portion for engaging the blind side end of the sleeve for bulbously deforming said sleeve bulbing portion on axial movement to the expander member,
   c. said system being characterized by the expander portion comprising a configured portion having protrusions, with a void volume between the minor and major diameters of the configured portions and between the protrusions, and wherein the volume of the sleeve expansion portion between the inner diameter thereof and the projection of the inner diameter of the bulbing portion is approximately 0.5 to 0.8 of the void volume of the configured portion.

15. The blind fastener system of claim 14, wherein said protrusions are blunt at their outer extremities.

16. The blind fastener system of claim 15, said protrusions being axially extending splines.

17. The blind fastener system of claim 14, said protrusions comprising a plurality of protrusions located axially and circumferentially on said configured portion.

* * * * *